Patented July 31, 1934

1,968,063

UNITED STATES PATENT OFFICE 1,968,063

PROCESS FOR THE PREPARATION OF HYDROGEN

John C. Woodhouse, Wilmington, Del., assignor, by mesne assignments, to E. I. du Pont de Nemours & Company, Wilmington, Del., a corporation of Delaware No Drawing. Application September 30, 1930, Serial No. 485,453. Renewed September 30, 1933

14 Claims. (Cl. 23—212)

This invention relates to the preparation of hydrogen by the interaction of a hydrocarbon and steam and particularly to a process for the preparation of the catalyst for effecting the reaction.

Hydrogen, particularly for use in the synthesis of ammonia, destructive hydrogenation of oil and similar commercial processes, can be economically and advantageously prepared by contacting natural gas or other gases which contain appreciable percentages of hydrocarbons, for example methane, ethane, propane, etc., with steam in the presence of a catalyst. It has been stated that in effecting this reaction with a gas containing methane, the following reaction will obtain—

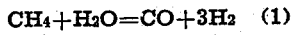

$$CH_4 + H_2O = CO + 3H_2 \quad (1)$$

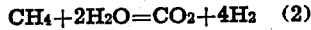

$$CH_4 + 2H_2O = CO_2 + 4H_2 \quad (2)$$

When the hydrocarbon conversion reaction is conducted at temperatures well above red heat, experimental data have indicated that reaction (1) above takes place to a considerable extent in conjunction with reaction (2), so that there is a relatively large percentage of carbon monoxide in the produced gases. As carbon monoxide will react with steam to form carbon dioxide and hydrogen, it is evident that the presence of carbon monoxide indicates a loss of possible hydrogen. It has, therefore, been found advisable to conduct the reaction at temperatures below 700° C. at which temperature reaction (1) is apparently inhibited with a resultant low percentage of carbon monoxide in the hydrogen obtained.

Various methods have been proposed for the preparation of catalysts for the above described reactions but as these catalysts were prepared generally for conducting the conversion at temperatures well above red heat, all of them are not particularly applicable to the preparation of catalysts to be used at the lower temperatures, especially as the activity of the catalyst under any condition is controlled in a large measure by its method of preparation. For example, it has been found in reducing metal catalysts with hydrogen, that if the temperature of the catalyst be allowed to advance above a certain degree, the activity of the catalyst is inhibited and in some instances its period of utility is likewise shortened, which often results from sintering of the catalyst due to the high temperature treatment. Moreover, when preparing catalysts by methods already described in the literature, many metals are difficult and others impossible of complete reduction at temperatures at which the efficiency of the catalyst is not deleteriously effected. As a result many metals which should be useful as catalysts if they could be reduced at the correct temperatures were prior to my invention, useless as such while the efficiency of other catalysts was greatly impaired.

An object of the present invention is to provide a catalytic process for the preparation of hydrogen by the interaction of a hydrocarbon and steam in the presence of a catalyst. Another object of this invention is to provide a process for the preparation of catalysts which are highly active for the hydrocarbon:steam reaction. A further object of this invention is to provide a process for the preparation of hydrocarbon conversion catalysts by reducing them with hydrogen under pressure. Other objects will hereinafter appear.

I have found that many of the disadvantages encountered in catalyst preparation can be eliminated by reducing the catalyst in the presence of hydrogen or an equivalent thereof under pressure. Those disadvantages resulting from high temperature treatment of the catalyst and particularly the hydrocarbon:steam conversion catalysts are greatly inhibited by my pressure-reduction process. Furthermore, essentially complete reduction of the catalyst can be obtained at temperatures well below that at which the sintering and loss of activity of the catalyst results, with a corresponding increase in activity and length of life of the catalyst.

In preparing a given catalyst in accord with my invention, it is not essential that any particular salt of the metal be used, for good catalysts may be prepared from the metal in any suitable chemical state, such as the hydroxide or nitrate of the metal, or even in some instances, from the oxide thereof. The metal which has been prepared, for example, as an oxalate or as a hydroxide, is filtered and washed free from the precipitant, etc. and after drying at a temperature of approximately 110° C. for a sufficient time to remove the included water, is heated in a muffle furnace to a temperature in the neighborhood of approximately 250° C., while hydrogen under a pressure greater than atmospheric is passed over the metal. It is often of advantage to reduce the catalyst under similar conditions in the converter just prior to the commencement of the conversion reaction. After a relatively short period of reduction, the catalyst will be reduced, and be found to be highly reactive for various catalytic reactions.

The catalysts which may be reduced by my process comprise any of the catalysts suitable for the hydrocarbon: steam conversion reaction. It is, of course, advisable that they do not contain substances which poison their activity. Metals, and particularly the metals of the iron group such as nickel, iron, and cobalt, may be quickly and efficiently reduced by my process with a resultant increase in activity of the catalysts so reduced, over an equivalent amount of catalyst reduced without increased pressure. Reduction of the catalyst by hydrogen under pressure is likewise applicable to the preparation of compound catalysts or to the unpromoted or promoted catalysts such as those described in the Roger Williams application Ser. No. 118,600. I have likewise found that when preparing the unpromoted nickel catalysts by reducing with cracked methanol, as described in my co-pending application, Serial No. 475,615, that a catalyst having excellent activity and long life will be prepared by first reducing in accord with the present process and then completing the reduction in the presence of carbon monoxide and hydrogen.

The temperature at which this reduction should preferably take place, while somewhat dependent on the catalyst in question, is not particularly critical, it being merely necessary to raise the temperature of the catalyst to such a point that essentially complete reduction will be effected. This temperature, of course, will vary with the type of catalyst employed, but I have generally found that a maximum temperature of 300° C. is sufficient for most catalysts, although, of course, in some instances, where a difficultly reducible catalyst is encountered, this temperature may be advantageously increased even up to as high as 500° C., if at that temperature the activity of the particular catalyst under these conditions be not inhibited,—it being borne in mind, however, that the lowest temperature at which essentially complete reduction of the catalyst can be effected, is the preferred temperature for the treatment of that particular catalyst.

The following examples will serve to indicate a preferred procedure in carrying out the invention, it being understood, however, that the invention is not limited by the details or proportions therein described. Conditions of temperature, pressure and time of reaction, etc., employed in the reduction and activation of the catalyst, may vary over a wide range without departing from the invention.

*Example 1.*—Dissolve 245 grams of nickel nitrate in 1500 cc. of water. To this, with both at 45° C., add gradually while stirring, 144 grams of oxalic acid dissolved in 750 cc. of water. Wash the precipitate three times by decantation with water, dry at 120° C., ignite three hours at 400° C. Form into briquets and crush to 8 to 14 mesh. These particles are placed in an electric furnace or directly in the converter and reduced at a temperature of 275° C. with hydrogen under a pressure of 26 atmospheres.

The resultant catalyst may be used in the steam conversion of methane or other hydrocarbon for the production of hydrogen, for example, the catalyst, which I generally prefer to reduce in the conversion chamber, may act upon a gaseous mixture composed of 10 parts of steam to 1 part of methane at a temperature of approximately 550° C., the gas flowing at a space velocity in the neighborhood of 650. The space velocity is the volume of gas under standard conditions of temperature and pressure per unit volume of catalyst employed. By effecting the conversion under the above conditions a product will be obtained resulting in a conversion of approximately 85-90% of the methane to hydrogen.

*Example 2.*—The following example will indicate the exceptional and unexpected advantages which are derived from conducting catalyst preparation with hydrogen under pressure rather than with hydrogen at but one atmosphere. Nickel oxide (which is rather difficult of reduction) was reduced in one instance with hydrogen at one atmosphere and in the second instance with hydrogen at 26 atmospheres pressure, the reduction in each instance taking place in identical apparatus and under similar conditions of pressure, and temperature gradient. In order to determine the end point of such reduction reactions the water given off from the reduction is determined. When no more moisture appears,— the reduction is complete. The following table compiled from data on the reduction of nickel indicates by the cc. of water evolved, at each temperature gradient, the progress of the reduction. Forty minutes were allowed at each temperature in both cases. The flow of hydrogen per unit time was the same in the two cases.

| °C. | Atmospheres pressure | |
| --- | --- | --- |
| | 1 | 26 |
| | cc. | cc. |
| 200 | 0.0 | 0.0 |
| 225 | 0.0 | 2.6 |
| 250 | 1.1 | 0.2 |
| 275 | 0.2 | 0.0 |
| 300 | 0.2 | 0.0 |
| 325 | 0.6 | 0.0 |
| 350 | 0.0 | 0.0 |
| 375 | 0.2 | 0.0 |
| 400 | 0.1 | 0.0 |
| 425 | 0.2 | 0.0 |
| 450 | 0.1 | 0.0 |
| 475 | 0.1 | 0.0 |
| 500 | 0.0 | 0.0 |

From a consideration of the above table, it will be realized that when working at the 26 atmospheres pressure the catalyst was fully reduced at a temperature 275° C. while there would be some question of the complete reduction of the same catalyst even at 500° C. when a pressure of one atmosphere was employed. A catalyst removed from the reduction at 26 atmospheres when it had attained a temperature 275° C., was more active and had a longer life than the catalyst obtained by reduction at one atmosphere wherein the catalyst had to be heated to a temperature of 500° C. to attain full reduction. This high temperature probably resulted in some sintering of the catalyst which was not present under the condition of high pressure and lower temperature. As the time intervals between each temperature gradient was the same in the test at 1 atmosphere and at 26 atmospheres, it is, therefore, apparent that when reducing under pressure the catalyst undergoes reduction in one-fourth of the time required at 1 atmosphere. This has not only an economic advantage but likewise to aid in producing a more highly active catalyst.

The pressures which I have found suitable for this reduction, range from pressures above one atmosphere to 50 atmospheres or even higher. The lower pressures, of course, of say 5 atmospheres or less, do not show the same degree of advantage that are obtained at the pressures of, say, in the neighborhood of 25 atmospheres. However, in some instances, lower pressures may be found suitable if complete reduction can be obtained with them at a sufficiently low temperature so that no sintering or deleterious effect due to the extended period of treatment lowers too extensively the efficiency of the catalyst.

Not only does my process of reduction increase the activity of the catalyst and extend its useful life but the amount of excess hydrogen employed in the reduction is likewise decreased generally to about one-fourth of the amount required at atmospheric pressure with a resultant decrease in the cost of reduction. Economy is likewise augmented by the decreased reduction time, thus lowering overhead expense on this operation.

While I have spoken primarily of the utilization of hydrogen for the reduction of the catalyst, other reducing gases which are equivalent to hydrogen in their activity as reducing agents, may likewise be employed for this process. Carbon monoxide, for example, when used under pressures in the neighborhood of 25 atmospheres, results in the production of a catalyst having greater activity than the catalyst prepared at atmospheric pressure. In using carbon monoxide the temperature of reduction should be accurately controlled as such a reduction is generally highly exothermic.

Various changes may be made in the above process, such as in the temperature and pressure utilized in the reduction and in the type of catalyst reduced, without in any way departing from this invention or sacrificing any of the advantages that may be derived therefrom.

I claim:

1. A process for producing a catalyst for the conversion of a hydrocarbon and steam into hydrogen which comprises reducing a metal compound in the presence of a reducing gas under a pressure greater than atmospheric.

2. A process for producing a catalyst for the conversion of a hydrocarbon and steam into hydrogen which comprises reducing an oxide-containing metal compound in the presence of a reducing gas under a pressure greater than atmospheric.

3. A process for producing a catalyst for the conversion of a hydrocarbon and steam into hydrogen which comprises reducing an oxide-containing metal compound in the presence of hydrogen under a pressure greater than atmospheric up to 50 atmospheres.

4. A process for producing a catalyst for the conversion of a hydrocarbon and steam into hydrogen which comprises reducing a metal oxide in the presence of hydrogen under a pressure greater than atmospheric.

5. A process for producing a catalyst for the conversion of a hydrocarbon and steam into hydrogen which comprises reducing a nickel compound in the presence of hydrogen under a pressure greater than atmospheric.

6. A process for producing a catalyst for the conversion of a hydrocarbon and steam into hydrogen which comprises reducing nickel oxide in the presence of hydrogen under a pressure greater than atmospheric.

7. A process for producing a catalyst for the conversion of a hydrocarbon and steam into hydrogen which comprises reducing a nickel compound and a promoter therefor in the presence of hydrogen under a pressure greater than atmospheric.

8. A process for producing a catalyst for the conversion of a hydrocarbon and steam into hydrogen which comprises reducing a nickel oxide and cerium oxide in the presence of hydrogen under a pressure greater than atmospheric.

9. A process for the preparation of hydrogen from a hydrocarbon and steam in the presence of a catalyst which comprises conducting the hydrocarbon and steam over a metallic catalyst which has been rendered active for this catalysis by having been reduced with hydrogen under greater than atmospheric pressure, the catalyst being more active than a similar catalyst reduced under atmospheric pressure.

10. A process for the preparation of hydrogen from a hydrocarbon and steam in the presence of a catalyst which comprises conducting the hydrocarbon and steam over a metallic catalyst which has been rendered active for this catalysis by having been reduced with hydrogen at a pressure of more than one atmosphere up to 50 atmospheres, the catalyst being more active than a similar catalyst reduced under atmospheric pressure.

11. A process for the preparation of hydrogen from a hydrocarbon and steam in the presence of a nickel catalyst which comprises conducting the hydrocarbon and steam over the nickel catalyst which has been rendered active for this catalysis by having been reduced with hydrogen under pressure, the nickel catalyst being more active than a similar nickel catalyst reduced under atmospheric pressure.

12. A process for the preparation of hydrogen from a hydrocarbon and steam in the presence of a promoted nickel catalyst which comprises conducting the hydrocarbon and steam over the promoted nickel catalyst which has been rendered active for this catalysis by having been reduced with hydrogen under pressure, the promoted nickel catalyst being more active than a similar promoter nickel catalyst reduced under atmospheric pressure.

13. A catalyst for the conversion of a hydrocarbon and steam into hydrogen which has been rendered active for this catalysis by having been reduced with hydrogen under greater than atmospheric pressure, whereby it is rendered more active than a similar catalyst reduced under atmospheric pressure.

14. A nickel catalyst for the conversion of a hydrocarbon and steam into hydrogen which has been rendered active for this catalysis by having been reduced with hydrogen under greater than atmospheric pressure, whereby it is rendered more active than a simiar nickel catalyst rendered under atmospheric pressure.

JOHN C. WOODHOUSE.